United States Patent
Lebrun et al.

(10) Patent No.: US 8,761,659 B1
(45) Date of Patent: Jun. 24, 2014

(54) INTEGRATION OF E-LEARNING WITH BUSINESS INTELLIGENCE SYSTEM

(75) Inventors: Joel Lebrun, Arlington, VA (US); Javier Aldrete, Herndon, VA (US); Christopher Von Simson, Arlington, VA (US); Daniel Todd Kerzner, Arlington, VA (US); Jeffrey A. Bedell, Arlington, VA (US); Benjamin Z. Li, McLean, VA (US); Ramkumar Ramachandran, Reston, VA (US); L. Douglas Everhart, Vienna, VA (US)

(73) Assignee: Microstrategy, Inc., McLean, VA (US)

( * ) Notice: Subject to any disclaimer, the term of this patent is extended or adjusted under 35 U.S.C. 154(b) by 2352 days.

(21) Appl. No.: 11/055,716

(22) Filed: Feb. 11, 2005

(51) Int. Cl.
*G09B 7/00* (2006.01)

(52) U.S. Cl.
USPC .......................................................... 434/362

(58) Field of Classification Search
USPC .......................................................... 434/118
See application file for complete search history.

(56) References Cited

U.S. PATENT DOCUMENTS

| | | | |
|---|---|---|---|
| 4,514,826 A | 4/1985 | Iwata | |
| 4,688,195 A | 8/1987 | Thompson | |
| 4,755,929 A | 7/1988 | Outous | |
| 4,829,423 A | 5/1989 | Tennant | |
| 4,876,643 A | 10/1989 | McNeil | |
| 5,197,005 A | 3/1993 | Shwartz | |
| 5,247,665 A | 9/1993 | Matsuda | |
| 5,276,870 A | 1/1994 | Shan | |
| 5,349,684 A | 9/1994 | Edem | |
| 5,418,943 A | 5/1995 | Borgida | |
| 5,421,008 A | 5/1995 | Banning | |
| 5,496,177 A * | 3/1996 | Collia et al. | 434/118 |
| 5,537,603 A | 7/1996 | Baum | |
| 5,555,403 A | 9/1996 | Cambot | |
| 5,584,024 A | 12/1996 | Shwartz | |
| 5,659,734 A | 8/1997 | Tsuruta | |
| 5,664,182 A | 9/1997 | Nirenberg | |
| 5,692,181 A | 11/1997 | Anand | |
| 5,864,856 A | 1/1999 | Young | |
| 5,914,878 A | 6/1999 | Yamamoto | |
| 5,970,493 A | 10/1999 | Shoup | |

(Continued)

OTHER PUBLICATIONS

Stern, Robert C. et al., A Menu-Based Natural Language Interface to a Large Database, Texas Instruments Incorporated, P. O. Box 660246, MS 238, Dallas, Texas 75266, NAECON: National Aerospace & Electronics Conference, Dayton, Ohio, May 20-24, 1985.

(Continued)

*Primary Examiner* — Sam Yao
*Assistant Examiner* — Evan Page
(74) *Attorney, Agent, or Firm* — Hunton & Williams LLP (57) ABSTRACT

A business intelligence system comprises a business intelligence interface system that enables users to interface with a business intelligence system and an electronic learning system that delivers electronic learning related to the business intelligence system. The business intelligence interface system enables one or more portions, such as folders of reports, individual reports, metadata or other business intelligence objects, or a report definition, of the business intelligence system for use by a user based on information related to whether the user has engaged in electronic learning associated with the one or more portions. A user may self-provision access by earning a privilege based on reviewing a lesson, passing a test, and/or other activities relative to the business intelligence object. Upon meeting electronic learning criteria, the electronic learning system updates privileges to enable access to the business intelligence object or class of objects.

35 Claims, 11 Drawing Sheets

(56) References Cited

U.S. PATENT DOCUMENTS

| | | | |
|---|---|---|---|
| 6,006,251 | A | 12/1999 | Yoyouchi |
| 6,012,066 | A | 1/2000 | Discount |
| 6,073,134 | A | 6/2000 | Shoup |
| 6,078,924 | A | 6/2000 | Ainsbury |
| 6,108,657 | A | 8/2000 | Shoup |
| 6,154,766 | A | 11/2000 | Yost et al. |
| 6,247,008 | B1 | 6/2001 | Cambot |
| 6,279,033 | B1 | 8/2001 | Selvarajan et al. |
| 6,697,808 | B1 | 2/2004 | Hurwood et al. |
| 2002/0065673 | A1* | 5/2002 | Rooke .............................. 705/1 |
| 2002/0127531 | A1* | 9/2002 | Kamens et al. ............... 434/350 |

OTHER PUBLICATIONS

Tennant, Harry R. et al., Computer Science Laboratory, Central Research Laboratories, Texas Instruments Incorporated, Dallas, Texas, 21st Annual Meeting of the Association for Computational Linguistics, MIT, Jun. 1983, pp. 151-158.

Tennant, Harry, Member, IEEE, Roger R. Bate, Member, IEEE, Stephen M. Corey, Lawrence Davis, Paul Kline, LaMott G. Oren, Malipatola Rajinikanth, Richard Saenz, Daniel Stenger, Member, IEEE, and Craig W. Thompson, Software Innovations for the Texas Instruments Explorer Computer, Proceedings of the IEEE, vol. 73, No. 12, Dec. 1985.

Thompson, Craig W., et al., Building Usable Menu-Based Natural Language Interfaces to Databases, Proceedings of the Ninth International Conference on Very Large Data Bases, Florence, Italy, Oct. 31-Nov. 2, 1983, pp. 43-55.

Thompson, Craig W. et al., John Kolts, and Kenneth W. Ross, A Toolkit for Building "Menu-Based Natural Language" Interfaces, Texas Instruments Incorporated, P. O. Box 226015, MS 238, Dallas, Texas 75265, 1985.

Thompson, Craig W., M.A., B.A., Using Menu-Based Natural Language Understanding to Avoid Problems Associated with Traditional Natural Language Interfaces to Databases, Dissertation Presented to the Faculty of the Graduate School of the University of Texas at Austin, May 1984.

MicroStrategy Introduces DSS Server 5.0, Dynamic Data Marts Enable Creation of Application Subsets, Reduce Warehouse Development Time, and Facilitate Integration with Third Party Tools, DCI Data Warehouse Conference, Phoenix, Arizona, Oct. 7, 1997.

MicroStrategy Enhances DSS Server to Support E-Business Initiatives with Improved Performance, Reliability, and Scalability, 5.6 Release Increases Throughput, Streamlines Processing and Offers Support for Microsoft Cluster Server, Vienna, Virginia, Jun. 8, 1999.

MicroStrategy Announces Enhanced Versions of DSS Web and DSS Server, New 5.5 Versions offer Advanced Reporting Functionality on Top of the Industry's Most Powerful Analytical Engine for Enterprise-Wide DSS Solutions, DSS World, Washington DC, Oct. 26, 1998.

Quick Start MicroStrategy Agent Version 6.0, published Oct. 1999, 13 pages.

User Guide MicroStrategy Agent Version 6.0, published Oct. 1999, 299 pages.

User Guide MicroStrategy Architect Version 6.0, published Oct. 1999, 214 pages.

User Guide MicroStrategy Objects Version 6.0, published Oct. 1999, 361 pages.

Excel Add-In MicroStrategy Objects Version 6.0, published Oct. 1999, 23 pages.

User Guide MicroStrategy Intelligence Server Version 6.0, published Oct. 1999, 316 pages.

User Guide MicroStrategy Administrator Version 6.0, published Oct. 1999, 207 pages.

Administrator Guide MicroStrategy Administrator Version 6.5, published Apr. 2000, 86 pages.

Kurz, A. et al., Data Warehousing Within Intranet: Prototype of a Web-Based Executive Information System, IEEE Database and Expert Systems Applications, pp. 627-632, Copyright © 1997.

Unknown Author, Business Objects User's Guide Version 5.1, Windows, 654 pages, Copyright © 2000.

Unknown Author, Getting Started with Business Objects Version 5.1, Windows, 152 pages, Copyright © 2000.

Unknown Author Business Objects Deployment Guide including Broadcast Agent 5.1, BusinessObjects 5.1, and WebIntelligence 2.6, Version 5.1, Windows and UNIX, 360 pages, Copyright © 2000.

Unknown Author, Broadcast Agent 5.1—Subsection of Business Objects Deployment Guide, Copyright © 2000.

Unknown Author, Web Intelligence 2.6—Subsection of Business Objects Deployment Guide, Copyright © 2000.

Unknown Author, Business Objects Designer's Guide Version 5.1, Windows, 272 pages Copyright © 2000.

Unknown Author, Business Objects Error Message Guide Version 5.1/2.6, Windows, 618 pages, Copyright © 2000.

Unknown Author, Business Objects Generic ODBC Access Guide Version 5.1, Windows, 98 pages, Copyright © 2000.

Unknown Author, Business Objects Info View User's Guide, Windows, UNIX, 354 pages, Copyright © 2000.

Unknown Author, Business Objects Installation and Upgrade Guide, Business Objects Enterprise Server Products and Business Objects Desktop Products, 252 pages, Copyright © 2000.

Unknown Author, Business Objects MS Access Database Guide Version 5.1, Windows, 106 pages, Copyright © 2000.

Unknown Author, Business Objects MS SQL Server Database Guide Version 5.1, Windows, 134 pages, Copyright © 2000.

Unknown Author, Business Objects Supervisor's Guide Version 5.1, Windows, 362 pages, Copyright © 2000.

Unknown Author, Administrator Guide MicroStrategy Broadcast Server Version 6.5 525 pages, published Apr. 2000.

\* cited by examiner

INTEGRATION OF E-LEARNING WITH BUSINESS INTELLIGENCE SYSTEM

The present invention relates to integration of electronic learning applications with business intelligence systems

BACKGROUND OF THE INVENTION

The ability to act quickly and decisively in today's increasingly competitive marketplace is critical to the success of any organization. The volume of data that is available to organizations is rapidly increasing and frequently overwhelming. The availability of large volumes of data presents various challenges. One challenge is to avoid inundating an individual with unnecessary information. Another challenge is to ensure all relevant information is available in a timely manner.

One known approach to addressing these and other challenges is known as data warehousing. Data warehouses, relational databases, and data marts are becoming important elements of many information delivery systems because they provide a central location where a reconciled version of data extracted from a wide variety of operational systems may be stored. As used herein, a data warehouse should be understood to be an informational database that stores shareable data from one or more operational databases of record, such as one or more transaction-based database systems. A data warehouse typically allows users to tap into a business's vast store of operational data to track and respond to business trends that facilitate forecasting and planning efforts. A data mart may be considered to be a type of data warehouse that focuses on a particular business segment.

Decision support systems have been developed to efficiently retrieve selected information from data warehouses. One type of decision support system is known as an on-line analytical processing system ("OLAP"). In general, OLAP systems analyze the data from a number of different perspectives and support complex analyses against large input data sets.

Typically, business users rely on the above-noted OLAP systems to analyze large volumes of their business information in order to ascertain useful trends and productivity information. The OLAP systems are used to query databases containing the business information and to generate customizable reports which summarize this information.

OLAP systems can be complicated to use and operate. Electronic learning and training systems exist, but such systems are limited to static generic content. It enables a user to experience generic business intelligence training related to concepts and uses. Manual training techniques are also used, but with corporate turnover, the cost of training and retraining hundreds or thousands of users of a business intelligence system can be prohibitive.

Therefore, these and other drawbacks exist with respect to conventional methods of training users on the use of a business intelligence system.

SUMMARY OF THE INVENTION

In view of the foregoing shortcomings of conventional systems, a business intelligence system of various embodiments of the present invention incorporates an electronic learning system that is integrated into the business intelligence system operations and that may be tailored to specific business intelligence user needs. In various embodiments, an on-line learning tool may be integrated with the business intelligence system with the ability of self-provisioning of business intelligence object, features, reports, or projects, for example, in the business intelligence interface after successful completion of testing or review of online lessons on use of the feature or report. In one example, an initial interface for the business intelligence system presents the user with limited functionality or content, such as by the use of access/security privileges associated with the user and determined by login or other detection methods. Upon completion of lessons and/or testing, a user may be automatically granted access to more content and/or functions through increased access/security privileges. Such automated self-provisioning reduces involvement of an administrator to manually increase privileges based on training obtained.

Various embodiments of the present invention may provide a business intelligence system that comprises a business intelligence interface system that enables users to interface with a business intelligence system and an electronic learning system that delivers electronic learning related to the business intelligence system. The business intelligence interface system enables one or more portions, such as folders of reports, individual reports, metadata or other business intelligence objects, or a report definition, of the business intelligence system for use by a user based on information related to whether the user has engaged in electronic learning associated with the one or more portions. A user may self-provision access by earning a privilege based on reviewing a lesson, passing a test, and/or other activities relative to the business intelligence object. Upon meeting electronic learning criteria, the electronic learning system updates privileges (which should be understood to include an entry or value on one or more access control lists) to enable access to the business intelligence object or class of objects.

According to another embodiment, a method of enabling access to business intelligence elements involves various acts, including, associating electronic learning elements with a business intelligence system object, displaying available business intelligence system objects to users, and disabling a business intelligence system object for a user based on information associated with the user and the business intelligence object related to the electronic learning element. The information may comprise an indication that the user has not completed the electronic learning element associated with the disabled electronic object. The method may further comprise providing the electronic learning element to the user and upon completion of the electronic learning element, enabling the business intelligence object for the user. The determination may be made based on a privilege associated with the user, the privilege indicating information about electronic learning for that user. The privilege may indicate whether the user may access a business intelligence object based on the user's electronic learning history. Also, the privilege may indicate whether the user may access a group of business intelligence objects based on the user's electronic learning history.

According to another embodiment of the present invention, a business intelligence system may comprise a business intelligence object repository storing a plurality of business intelligence objects, one or more of the business intelligence objects being associated with electronic learning content. A user database system stores information about users, the user database system storing for one or more users information about a privilege associated one or more business intelligence objects, the privilege being based on information about the user related to the electronic learning content associated with the one or more business intelligence objects. A business intelligence interface system enables access to business intelligence objects based on the user privilege related to the electronic learning content associated with the business intelligence object.

These and other features and advantages of the various embodiments will become more readily apparent when the detailed description of the preferred embodiments is read in conjunction with the attached drawings.

BRIEF DESCRIPTION OF THE DRAWINGS

FIG. 4 depicts an exemplary user interface in which a report is disabled based on electronic learning privileges according to one embodiment of the present invention.

FIG. 6 depicts an exemplary user interface presenting the report as being available for viewing according to one embodiment of the present invention.

DETAILED DESCRIPTION OF VARIOUS EMBODIMENTS

The following description is intended to convey a thorough understanding of the invention by providing embodiments and details involving business intelligence systems and incorporation of data mining objects therein. It is understood, however, that the invention is not limited to these specific embodiments and details, which are exemplary only. It further is understood that one possessing ordinary skill in the art, in light of known systems and methods, would appreciate the use of the various embodiments described herein for its intended purposes and benefits in any number of alternative embodiments, depending upon specific design and other needs.

As used herein, the term "business intelligence system" may be understood to refer to any type of computer system that utilizes one or more on-line analytical processing systems including, but not limited to ROLAP, MOLAP, and HOLAP systems. For example, this term may refer to a business intelligence system such as the MICROSTRATEGY 7i business intelligence platform available from MicroStrategy Inc., of McLean, Va.

As used herein, the term "electronic learning" may be understood to refer to content in electronic format designed to convey useful information, such as content derived by systems such as ePortal, for example.

Exemplary System Platform

Figure 1:
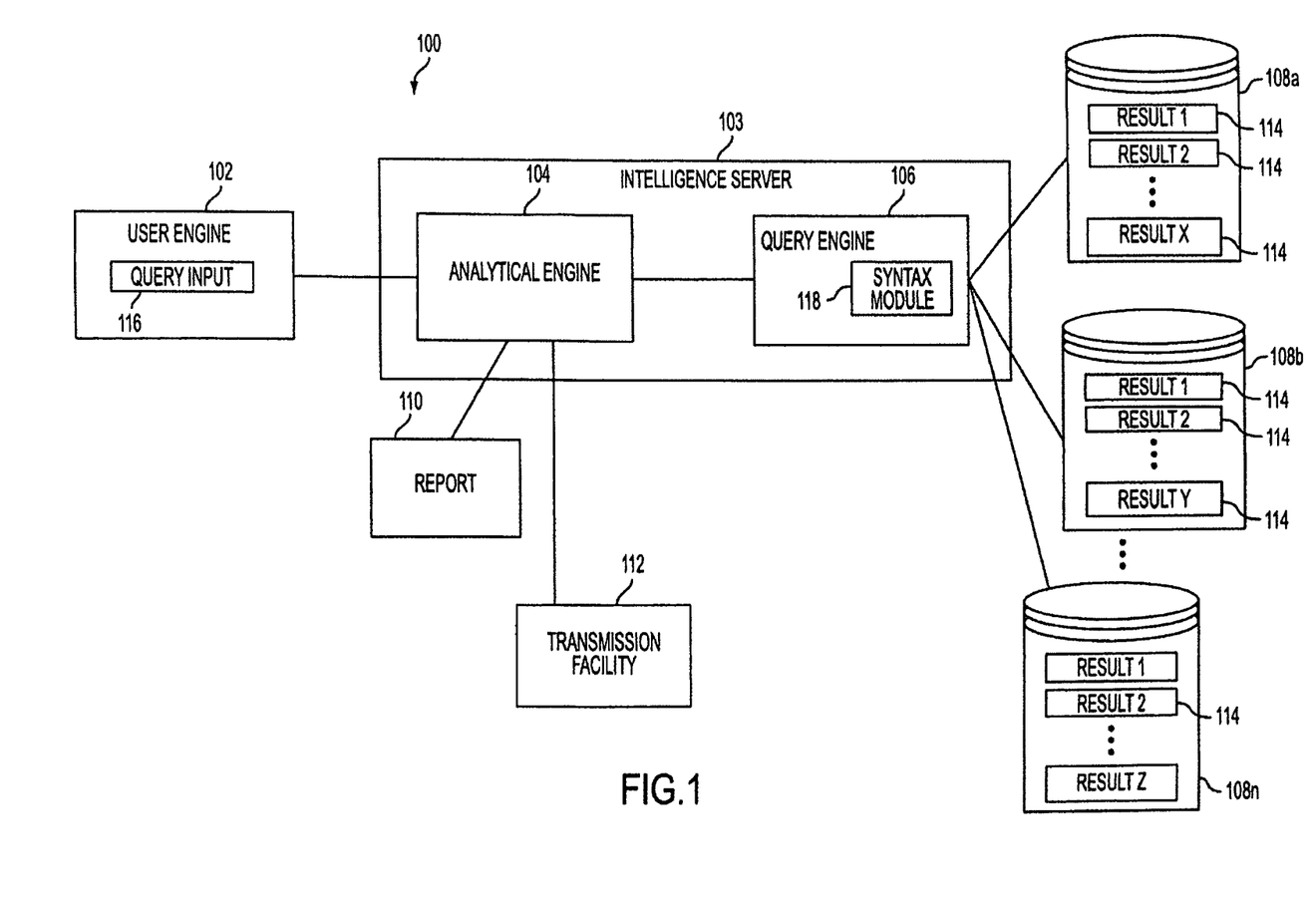
FIG. 1 depicts a block diagram illustrating an architecture for a reporting system for use with one or more embodiments of the invention.

Referring now to FIG. 1, FIG. 1 is a block diagram illustrating an architecture for a reporting system 100 by which a variety of data resources may be accessed for business analytic, report generation and other intelligence purposes for use with embodiments of the invention. According to one embodiment, the reporting system 100 may comprise a business intelligence, Online Analytical Processing (OLAP) decision support system (DSS) or other reporting system. In particular, FIG. 1 may comprise a portion of the MicroStrategy 7i platform which provides an exemplary system in which one or more embodiments of the present invention may be implemented.

In general, through using the reporting system 100, analysts, managers and other users may query or interrogate a plurality of databases or database arrays to extract demographic, sales, and/or financial data and information and other patterns from records stored in such databases or database arrays to identify strategic trends. Those strategic trends may not be discernable without processing the queries and treating the results of the data extraction according to the techniques performed by the systems and methods described herein. This is in part because the size and complexity of some data portfolios stored in such databases or database arrays may mask those trends.

In addition, the reporting system 100 may enable the creation of reports or the provision of services that are processed according to a predetermined schedule. The user may then subscribe to the services, provide personalization criteria and have the reports automatically delivered to the user, as described in U.S. Pat. No. 6,154,766 to Yost et al. (the "'766 Patent"), which is commonly assigned and hereby incorporated by reference in its entirety.

As illustrated in FIG. 1, a business, a government or another user may access the resources of the reporting system 100 using a user engine 102. The user engine 102 may include a query input module 116 to accept a plurality of searches, queries or other requests, via a query box on a graphical user interface (GUI) or another similar interface. The user engine 102 may communicate with an analytical engine 104. The analytical engine 104 may include a set of extensible modules to run a plurality of statistical analyses, to apply filtering criteria, to perform a neural net technique or another technique to condition and treat data extracted from data resources hosted in the reporting system 100, according to a query received from the user engine 102.

The analytical engine 104 may communicate with a query engine 106, which in turn interfaces to one or more data storage devices 108a, 108b ... 108n (where n is an arbitrary number). The data storage devices 108a, 108b ... 108n may include or interface to a relational database or another structured database stored on a hard disk, an optical disk, a solid state device or another similar storage media. It should be understood that while data storage devices 108a, 108b ... 108n are illustrated as a plurality of data storage devices, in some embodiments the data storage devices may be contained within a single database or another single resource.

Any of the user engine 102, the analytical engine 104 and the query engine 106 or other resources of the reporting system 100 may include or interface to or be supported by computing resources, such as one or more associated servers operating on known operating systems. According to one embodiment of the present invention, the analytical engine 104 and the query engine 106 may comprise elements of an intelligence server 103.

The data storage devices 108a, 108b ... 108n may be supported by a server or another resource and may, in some embodiments, include redundancy, such as a redundant array of independent disks (RAID), for data protection. The storage capacity of any one or more of the data storage devices 108a, 108b ... 108n may be of various sizes, from relatively small data sets to very large database (VLDB)-scale data sets, such as warehouses holding terabytes of data or more. The fields and types of data stored within the data storage devices 108a, 108b . . . 108n may also be diverse, and may include, for instance, financial, personal, news, marketing, technical, addressing, governmental, military, medical or other categories of data or information.

The query engine 106 may mediate one or more queries or information requests from those received from the user at the user engine 102 to parse, filter, format and otherwise process such queries to be submitted against the data contained in the data storage devices 108a, 108b . . . 108n. Thus, a user at the user engine 102 may submit a query requesting information in SQL format, or have the query translated to SQL format. The submitted query is then transmitted via the analytical engine 104 to the query engine 106. The query engine 106 may determine, for instance, whether the transmitted query may be processed by one or more resources of the data storage devices 108a, 108b . . . 108n in its original format. If so, the query engine 106 may directly transmit the query to one or more of the resources of the data storage devices 108a, 108b . . . 108n for processing.

If the transmitted query cannot be processed in its original format, the query engine 106 may perform a translation of the query from an original syntax to a syntax compatible with one or more of the data storage devices 108a, 108b . . . 108n by invoking a syntax module 118 to conform the syntax of the query to standard SQL, DB2, Informix™, Sybase™ formats or to other data structures, syntax or logic. The query engine 106 may likewise parse the transmitted query to determine whether it includes any invalid formatting or to trap other errors included in the transmitted query, such as a request for sales data for a future year or other similar types of errors. Upon detecting an invalid or an unsupported query, the query engine 106 may pass an error message back to the user engine 102 to await further user input.

When a valid query such as a search request is received and conformed to a proper format, the query engine 106 may pass the query to one or more of the data storage devices 108a, 108n . . . 108n for processing. In some embodiments, the query may be processed for one or more hits against one or more databases in the data storage devices 108a, 108b . . . 108n. For example, a manager of a restaurant chain, a retail vendor or another similar user may submit a query to view gross sales made by the restaurant chain or retail vendor in the State of New York for the year 1999. The data storage devices 108a, 108b . . . 108n may be searched for one or more fields corresponding to the query to generate a set of results 114.

Although illustrated in connection with each data storage device 108 in FIG. 1, the results 114 may be generated from querying any one or more of the databases of the data storage devices 108a, 108b . . . 108n, depending on which of the data resources produce hits from processing the search query. In some embodiments of the reporting system 100 of the invention, the results 114 may be maintained on one or more of the data storage devices 108a, 108b . . . 108n to permit one or more refinements, iterated queries, joinders or other operations to be performed on the data included in the results 114 before passing the information included in the results 114 back to the analytical engine 104 and other elements of the reporting system 100.

When any such refinements or other operations are concluded, the results 114 may be transmitted to the analytical engine 104 via the query engine 106. The analytical engine 104 may then perform statistical, logical or other operations on the results 114 for presentation to the user. For instance, the user may submit a query asking which of its retail stores in the State of New York reached $1M in sales at the earliest time in the year 1999. Or, the user may submit a query asking for an average, a mean and a standard deviation of an account balance on a portfolio of credit or other accounts.

The analytical engine 104 may process such queries to generate a quantitative report 110, which may include a table or other output indicating the results 114 extracted from the data storage devices 108a, 108b . . . 108n. The report 110 may be presented to the user via the user engine 102, and, in some embodiments, may be temporarily or permanently stored on the user engine 102, a client machine or elsewhere, or printed or otherwise output. In some embodiments of the reporting system 100 of the invention, the report 110 or other output may be transmitted to a transmission facility 112, for transmission to a set of personnel via an email, an instant message, a text-to-voice message, a video or via another channel or medium. The transmission facility 112 may include or interface to, for example, a personalized broadcast platform or service such as the NARROWCASTER platform or TELECASTER service sold by MicroStrategy Incorporated or another similar communications channel or medium. Similarly, in some embodiments of the invention, more than one user engine 102 or other client resource may permit multiple users to view the report 110, such as, for instance, via a corporate intranet or over the Internet using a Web browser. Various authorization and access protocols may be employed for security purposes to vary the access permitted users to such report 110 in such embodiments.

Exemplary Improved Business Intelligence Server System

Having appreciated the operations performed by a business intelligence server system as described with reference to FIG. 1, an improvement provided through various embodiments of the present invention incorporates electronic learning into the business intelligence system.

Figure 2:
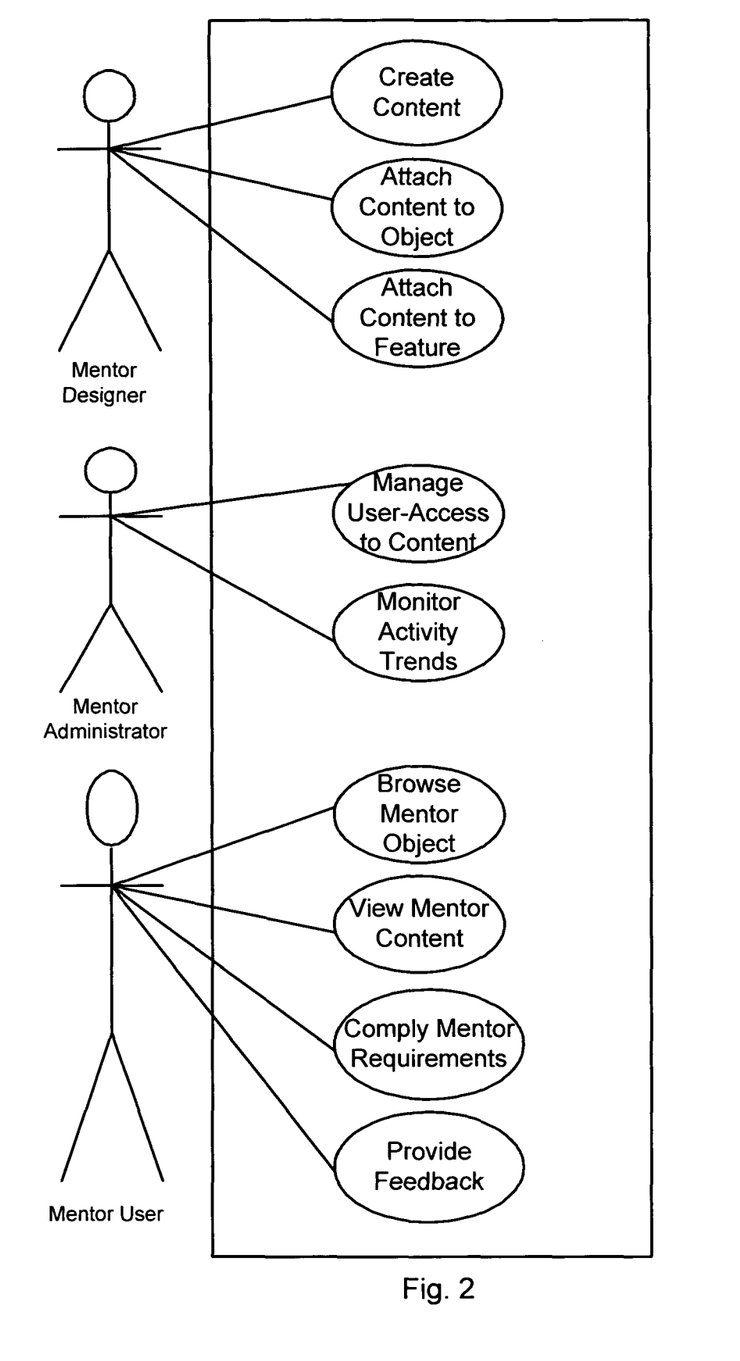
FIG. 2 depicts a schematic flow diagram representing activities for various users of the system according to one embodiment of the present invention.

As shown in FIG. 2, the system of the present invention envisions a number of activities to be performed by different users of the system. In particular, designers may be involved in creating content; attaching that content to an object such as a filter, report, folder or other element of a business intelligent system with which training, lessons, and tests may be associated; and/or attaching content to a feature of a business intelligent system with which training, lessons, and tests may be associated. An administrator user may manage user access to content and monitor activity and trends. An end user may be involved in browsing objects, viewing content, complying with electronic learning criteria such as lessons and tests and providing feedback on the effectiveness of the lessons and tests.

Figure 3:
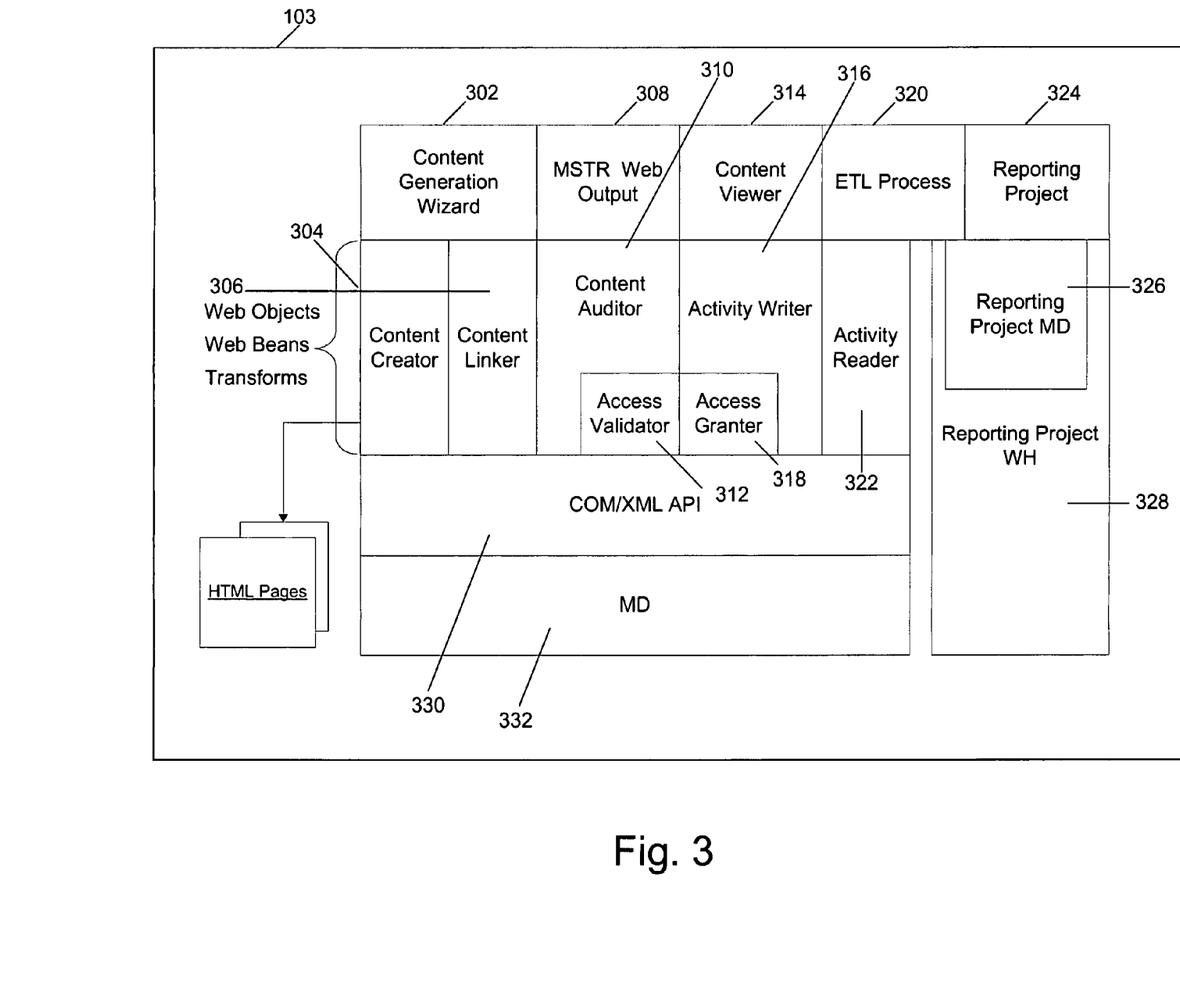
FIG. 3 depicts a schematic diagram of an integrated business intelligence in electronic learning system according to one embodiment of the present invention.
Figure 5A:
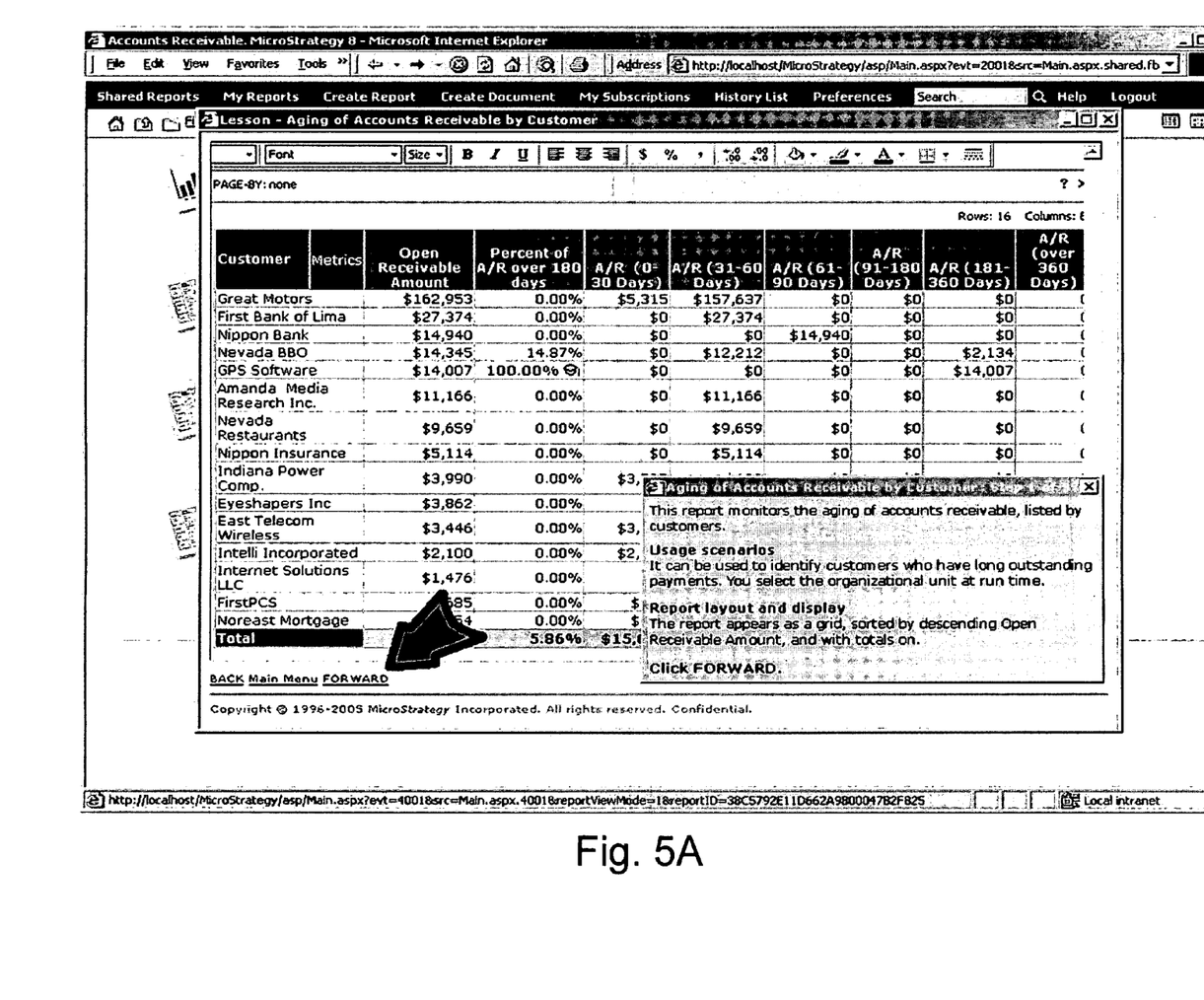
FIGS. 5A-5D depict an exemplary user interface including training information relating to a particular report according to one embodiment of the present invention.
Figure 5B:
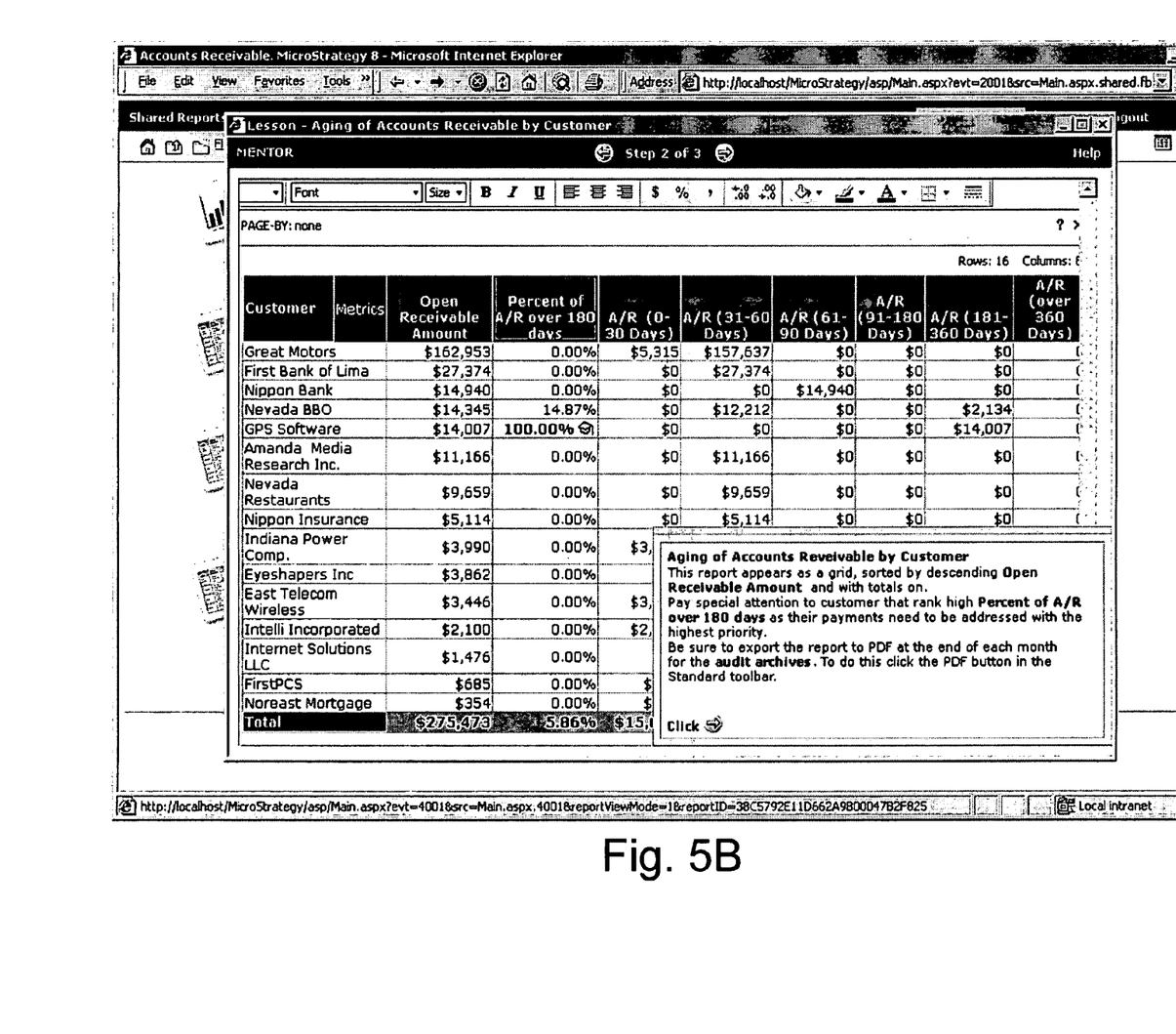
Figure 5C:
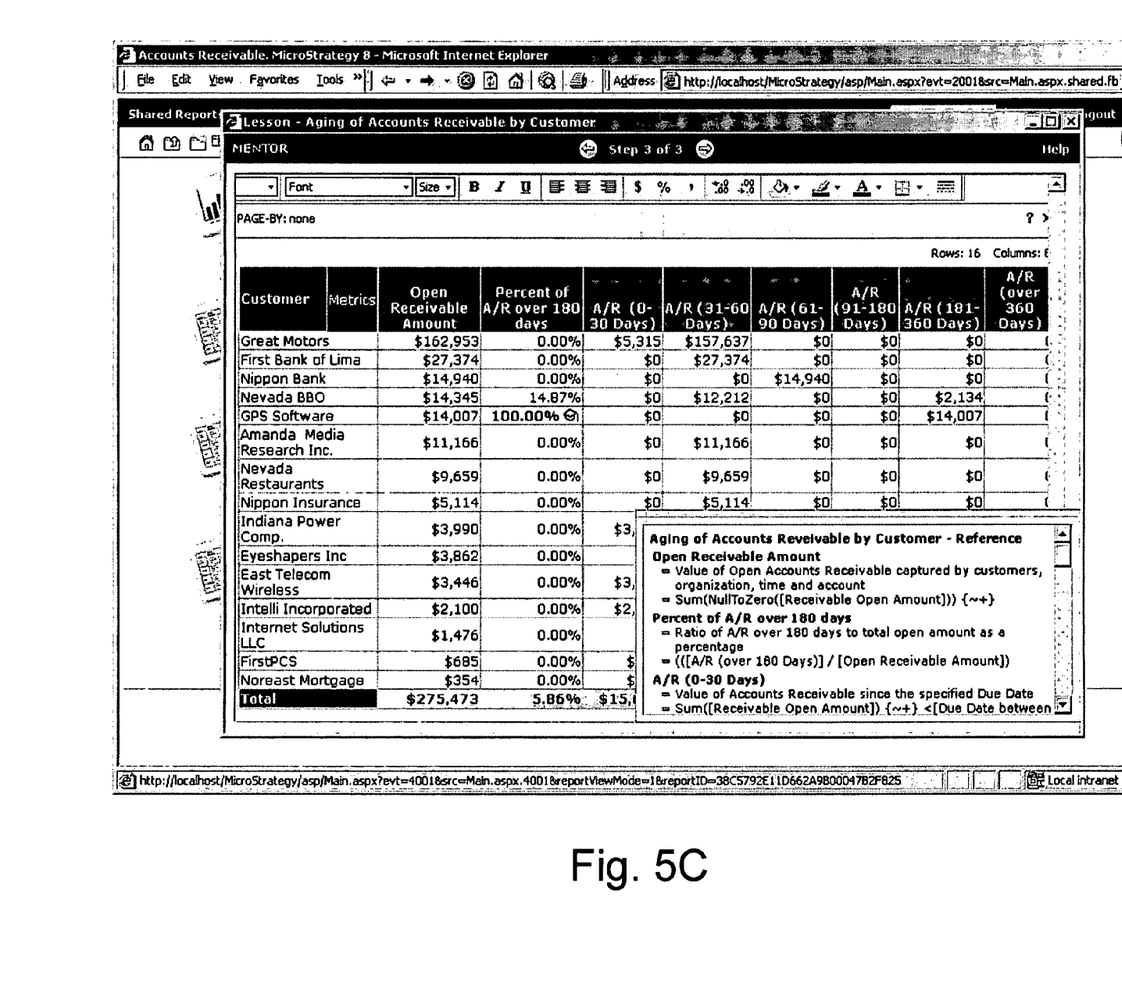
Figure 5D:
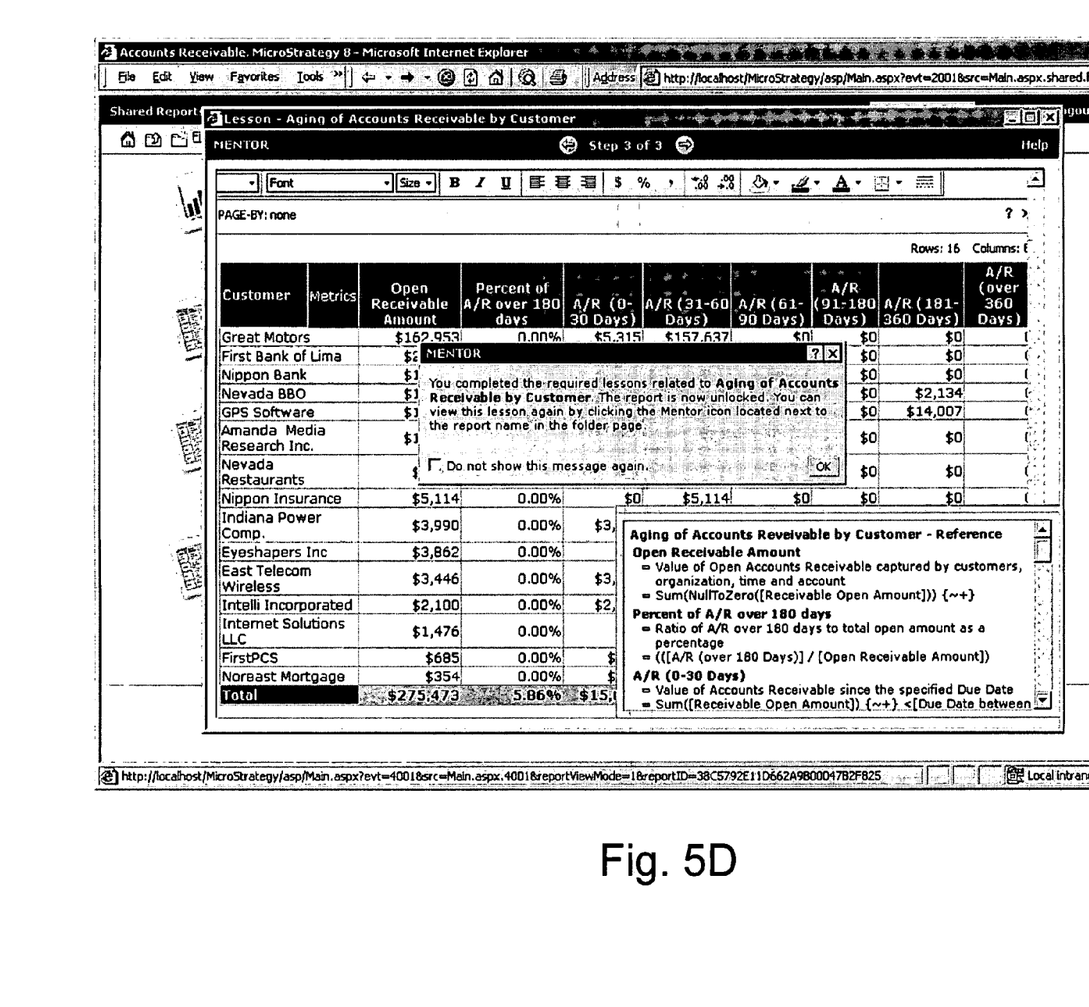

To provide the functionality described with respect to FIG. 2, a business intelligent system 103 may include a number of additional components as depicted in detail in FIG. 3. Although these components are illustrated as being a part of the business intelligent server 103, it should be appreciated that one or more of the components of FIG. 3 may be associated with related and connected systems. In particular, various content creation functions may be provided through use of a content generation wizard 302, a content creator 304, and a content linker 306. As depicted, content creator 304 and content linker 306 may be comprised of web objects, web beans, and/or transforms, for example, although other elements may be used as well. Content creation functions may provide a step by step process of guiding the user in the creation of electronic training and custom lessons and test. These functions may use the content creator and content linker elements to create content and attach it to business intelligence objects and/or features and/or functionality. In one embodiment, these elements may comprise a web based structure. Further, graphical user interfacing functionality may be provided by web output element 308, content auditor 310, and access validator 312. Web output element 308 may comprise MicroStrategy Web. While a web output element 308 is depicted, it should be appreciated that a desktop-based graphical user interface, such as MicroStrategy Desktop or MicroStrategy Office, may also be used. The graphical user interface components may integrate a business intelligence client application with the electronic learning capabilities of the embodiments described herein. The graphical user interface clients may comprise web based clients or desk top clients and may serve as the presentation glue between the different components of the architecture. Viewer functionality may be provided by viewer content element 314, activity writer 316 and access granter 318. These functions are provided to deliver the content in a form through a web based client, for example. In addition, activity monitoring functions may be provided by ETL process element 320, activity reader 322, reporting project element 324, reporting project metadata element 326, and reporting project warehouse 328. In addition, a COM/XML API element 330 and a metadata database 332 may also be provided as components of the overall system. Each of the components identified above will now be described in greater detail.

Content generation wizard 302 may provide an interface to allow users to step through creating electronic learning, training and testing. The content generation wizard 302 may interact with content creator 304 and content linker 306 to create content and attach it to business intelligence objects. Content creator 304 may provide a programmatic interface (API) to create lessons and tests as part of the electronic learning functionality. Through the content creator, user may create lessons, tests, lesson pages, and test page objects based on content provided usually in XML based files. In addition, content creator 304 allows a user to export or import the definition of content such as lessons and tests to or from other destinations/sources such as other XML files or metadata from this or other business intelligence systems.

Content linker 306 provides a programmatic interface similar to an API to attach the content created such as lessons and tests to business intelligence objects stored in the metadata such as projects, folders, reports, thresholds, and other business intelligence objects with which users interact. In addition, content linker 306 allows the user to define the user universe affected by the learning. For instance, an administrator user can define through content linker 306 what type of user is to be prompted with lessons and tests to access the particular object with which the electronic learning content has been associated. Specifically, an administrative user can use the content linker 306 to attach lessons, tests, or other electronic learning objects to business intelligence objects and/or features and/or functionality. Content linker 306 also allows the administrative user to define the user interface that is to be affected for each object to which the content has been attached. Content linker 306 also allows an administrative user to define what conditions are to be satisfied such that the user is granted access to the restrictive objects, such as reading a lesson, passing a test, or other conditions. Further, this element allows the administrative user to describe the way that the graphical user interfaces present options to the users, for example, what text will appear as the link.

Content creator 304 may store the objects in any location, including in the metadata 332. In one embodiment, electronic learning content may be stored in the form of ASP/JSP pages, for example, although other storage forms may also be used. As such, an administrative user can directly modify these pages using any editor such as a Front Page™ or Notepad.™ Further, these pages can later be viewed through the content viewer 314 component as described below. Ideally, content pages may also be stored in the metadata as an object for use in associating business intelligence objects with the electronic learning object. Business intelligence objects may then be modified to include a link to the electronic learning object that has been attached by content linker 306. Also, rather than modifying existing business intelligence objects, other methods of relating multiple objects to one another such as a table or linking structures may be used and checked each time an object from the business intelligence object metadata is provided to a user.

According to various embodiments of the present invention, privileges may be utilized by the system to determine what users have access to what information available through the business intelligent system. Accordingly, an electronic learning privilege may be added to the existing privileges in the system the specifies what level of privilege the user holds. Also, existing privileges may be correlated to electronic learning experience, achievement and/or criteria. That information may then be used by the system to determine whether to provide availability of an object or to disable the object and/or prompt the user to participate in a lesson test or other input in order to have access to the object. In addition, certain restricted objects may exist in the metadata repository. Accordingly, custom user groups may be created for each type of content such as a lesson or test, two user groups may be provided. A first group may be used to define the universe of users/user groups that are affected by a certain piece of content. This may be referred to as the universe group. Another group may be used to define the user group having access to the metadata objects for the business intelligent system. The second group may be added to the list of the related object granting access to that member of the group. When a user satisfies a criteria by viewing a lesson or passing a test for example, the user may be added to the access group to obtain access to the related object. This group may be referred to as the access group. User groups may be created in the configuration relating to a particular object when the user attaches content to a project. Using groups to manage the restricted objects and then granting access to them allows the operators of the system to be consistent with the business intelligence platform.

A web output module 308 may generate user interface information between the users and the content delivery modules described below. The graphical user interface output 308, although depicted as a web output, may also comprise desktop or other graphical user interface output system. Graphical user interface output 308 may interact with a content auditor to detect if certain objects have electronic learning information associated therewith. An access validator 312 may be used to check the level of access and provide links to the related content.

The content auditor 310 may be provided to verify if a business intelligence object, such as a project, folder, report, or otherwise, is related and/or linked to any electronic learning content. It may detect if electronic learning is relevant for a particular user based on privileges. In addition, if so, it may detect if the object has content attached or linked to it in order to determine whether or not to present the information.

Access validator 312 may be provided to determine what type of access credentials are granted to a specific user for a given business intelligence object. It may verify the access credentials of the user for a given object and must determine if the user is restricted to use/view/execute a certain object. In addition, access validator 312 may determine which content prerequisites such as viewing a lesson, passing a test, etc. are to be met to obtain access to the object.

Content viewer 314 may provide graphical user interface functionality to deliver the electronic learning content to the user. This element may act as a client for an electronic learning host for different pages. In addition, an activity writer 316 may be provided to generate a programmatic interface to store usage patterns of the electronic learning system by each user. This element may store information such as when it was last time it was opened, when it was completed, when a test was taken, the score obtained, etc. Additionally, this component may also use an access granter 318 component/service to grant access to the previously restricted objects. Access granter 318 may provide a programmatic interface or web service to allow a business intelligence user to be included in a user group. This component may be used by the client side components to grant access to a restricted object when a user completes a lesson or passes a test related to such an object. It may add a user to the group that grants access to the restricted objects. In addition, it may refresh or update the user run time credentials.

Activity monitoring may also be provided through the system. For example, an ETL process element 320 may be provided that extracts business intelligence user electronic learning content such as lessons and tests and their usage patterns and transform it into a format such as a data warehouse that can be used for further reporting. This may be achieved through interaction with an activity reader 322 that reads the activity information stored by activity writer 316 and transforming it into a data warehouse that a business intelligence project can later use to analyze it. Activity reader 322 may provide a programmatic interface to read the usage pattern of the electronic learning content, such as lessons and tests, for each business intelligence user. In addition, a reporting project 324 may be utilized to view and analyze usage patterns of different business intelligence users. A reporting project metadata repository 326 and a reporting project warehouse 328 may be provided as part of the system to provide the data for reporting project element 324.

Through the use of these components, the system may enable various components of a business intelligence reporting system to be made available to users upon achieving certain privileges that may be earned through proving their effectiveness at utilizing certain elements and/or simply participating in lessons. The way in which the graphical user interface layer of FIG. 3 may interact with the user is provided through an example shown in FIGS. 4-8. Specifically, FIG. 4 depicts an example of a graphical user interface presented by a business intelligence reporting system presenting the user with various choices related to reports. In the second report from the top on the right, the user is presented with a "grayed out" report title and a lock with an indication that the user is to "View Mentor Content to Access Object." The name "Mentor" is an illustrative example of a name that may be given to the electronic learning system. Thus, the folder is disabled to the user. Although grayed out wording and a lock are shown, other methods of displaying to the user that the element is disabled and not available to the user may also be used within the scope of the present invention. A link or other activation mechanism may be provided to enable the user to select to take the lesson or perform other steps indicated in order to gain access privileges to a particular folder, report, etc. Here, when the user selects the "View Mentor Content to Access Object" link in FIG. 4, the user may be presented with information explaining to the user the contents of the folder.

As this input explains, the user may select to access training material and when completed, take a test in order to become certified for this report. FIGS. 5A-5D depict exemplary information presented about the report and then a user may select to move forward, to additional information, a test, or to gain access to the report. The element in FIG. 4 may have previously shown a lock indicating that the user is to take a lesson to access the reports in that report. Afterward achieving electronic training, that lock may be removed, as may the "grayed out" portion of the user interface. A test may be provided to the user to allow the user to gain access to the report or other object/feature/function. Upon achieving a predetermined score on a test (which may compromise one or more questions), for example, an example prompt is provided in FIG. 6 depicts the user interface of FIG. 4 with the report being shown as enabled to the user based on the user's completion of the test.

Figure 7:
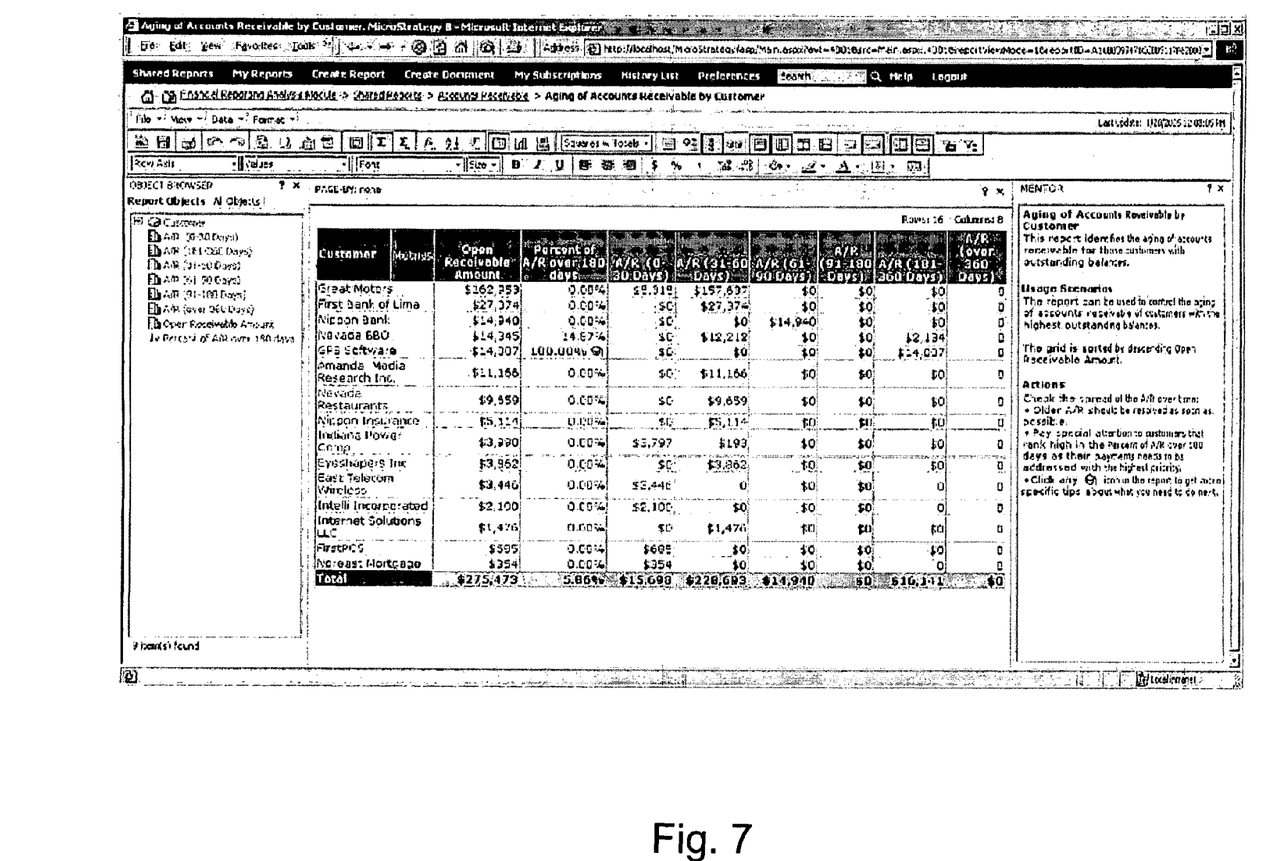
FIG. 7 depicts an exemplary user interface showing information regarding passage of a test by region according to one embodiment of the present invention.
Figure 8:
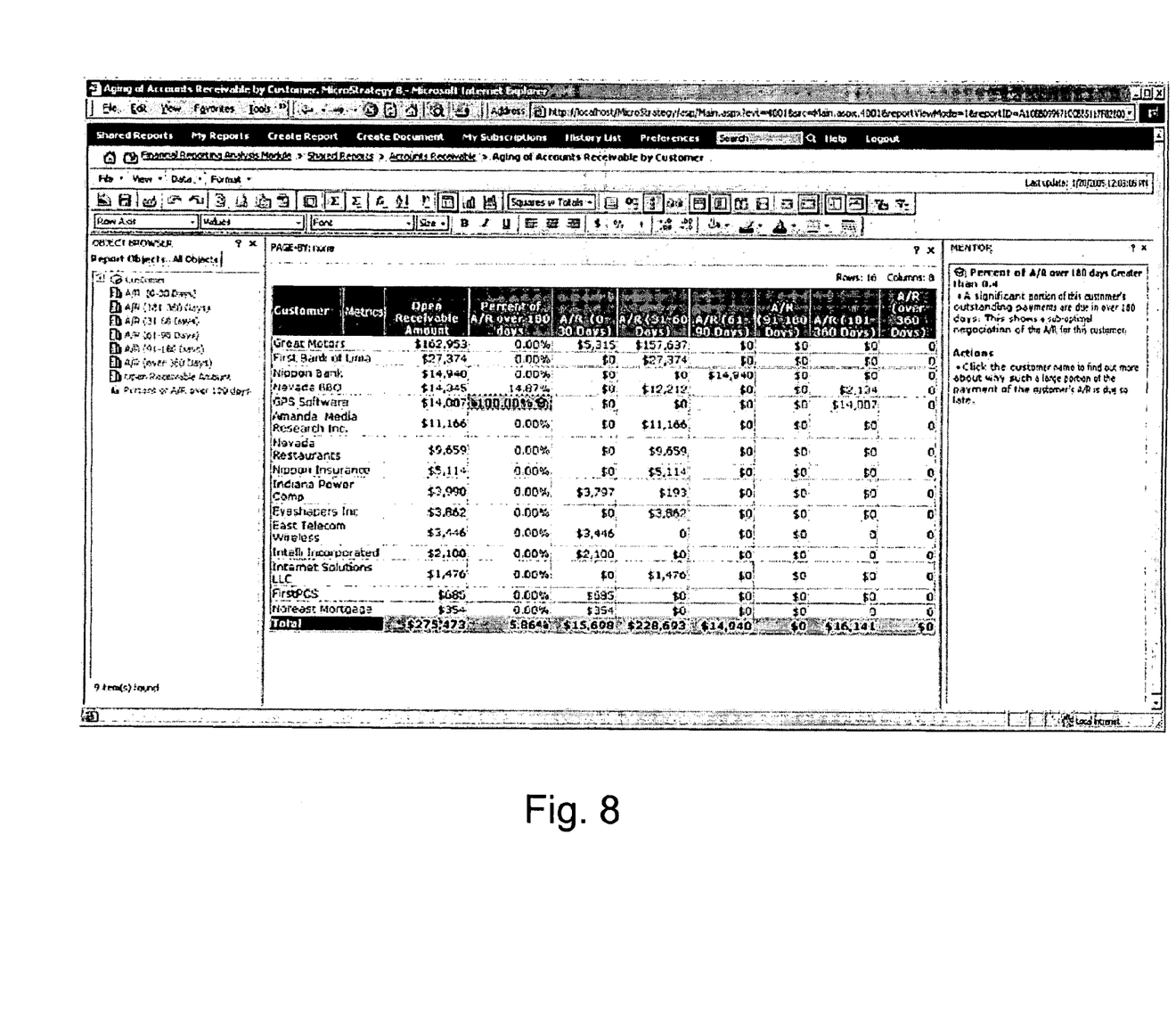
FIG. 8 depicts an exemplary user interface depicting cost savings due to training according to one embodiment of the present invention.

FIGS. 7-8 depict user interfaces related to contents attached to a report itself and displayed inside of a report. For example, a symbol (here a cap and gown symbol) may be indicated by an entry for which electronic learning information is available. That learning information may be presented prior to permitting the user to see the value, in one embodiment. For example, in FIG. 8, a user may select the symbol (or otherwise indicate an intention to see information) related to the threshold condition and be shown relevant electronic learning content in a panel (here shown on the right hand side). that may be used to teach e-learning users about various types of reports. The reports depicted are exemplary of reports about which e-learning users may need training.

The system of the present invention may also provide functionality to enable a user to create lessons and tests for association with business intelligence objects and to grant and change access privileges and to modify or edit such lessons, tests, associations, etc. A user interface may be provided that enables the person to prepare a lesson that indicates a name of the lesson and the text based content for the lesson. Further, an image or example graphic may be provided to show the user an example of portions of a report for example and the user may be able to determine where on the screen that information will be placed. In addition, multiple pages may be provided by the user. The user interface for the lesson creation mechanism may receive and store this information. Further, the user may be able to define the level of access by selecting users from a drop down menu selecting groups and specifying which are authorized and which individuals or groups should become qualified or credentialed through watching the lesson or passing the test. A user may elect to attach content to an object by the user interface from which that administrative user would be able to view what reports are available to various users of the business intelligent system. For an administrative user or a user with electronic learning content creation privileges, a user may be presented with an option to attach an electronic learning object to a report through the graphical user interface. Upon selecting to do so, a drop down menu of available electronic learning objects may be presented and the user may select from among that list. In addition, the user may be able to create tests associated with objects. For example, the user may be prompted to select whether to create a test from scratch or based on a lesson. If based on a lesson, then the user may be prompted to select which lesson the test should be based upon and the user may then be prompted to provide a name of the test and the images or inputs associated with the test, the location where the question will be placed on the graphical user interface and the text for the question. In addition, the text for the answer may be provided as well. Accordingly, through a system described above, users may grant themselves privileges to reports without requiring the interaction with an administrator who would manually do so otherwise. This system thus provides tremendous cost advantages by reducing the number of administrators required to implement a business intelligent system by reducing the amount of training in a manual format. Further, complete integration of the electronic learning with the business intelligence system improves the operations of the enterprise because users spend less time initiating reports based on incorrect understandings of the report. Overall cost savings and efficiencies are achieved as a result.

It will be apparent to those skilled in the art that various modifications and variations can be made in the apparatuses and methods of the present invention without departing from the scope or spirit of the invention. Thus, it is intended that the present invention cover the modifications and variations of this invention provided they come within the scope of the appended claims and their equivalents.

APPENDIX A

```
- <xs: element name="PMML">
  - <xs: complexType>
    - <xs: sequence>
        <xs: element ref="Header" />
        <xs: element ref="MiningBuildTask" minOccurs="0" maxOccurs="1" />
        <xs: element ref="DataDictionary" />
        <xs:element ref="TransformationDictionary" minOccurs="0" maxOccurs="1" />
      - <xs: sequence minOccurs="0" maxOccurs="unbounded">
        - <xs: choice>
            <xs: element ref="TreeModel" />
            <xs: element ref="NeuralNetwork" />
            <xs: element ref="ClusteringModel" />
            <xs: element ref="RegressionModel" />
            <xs: element ref="GeneralRegressionModel" />
            <xs: element ref="NaiveBayesModel" />
            <xs: element ref="AssociationModel" />
            <xs: element ref="SequenceModel" />
          </xs: choice>
        </xs: sequence>
        <xs: element ref="Extension" minOccurs="0" maxOccurs="unbounded" />
    </xs: sequence>
    <xs: attribute name="version" type="xs:string" use="required" />
  </xs: complexType>
</xs: element>
```

What is claimed is:

1. A business intelligence system comprising:
   a business intelligence interface system that enables users to interface with a business intelligence system;
   an electronic learning system that delivers electronic learning related to the business intelligence system; and
   wherein the business intelligence interface system utilizes a web service to enable one or more portions of the business intelligence system for use by a user based on information related to whether the user has engaged in electronic learning associated with the one or more portions.

2. The business intelligence system of claim 1 wherein the business intelligence interface system disables one or more portions of the business intelligence system if the user has not engaged in electronic learning associated with the one or more portions.

3. The business intelligence system of claim 1 wherein the one or more portions comprise at least one of a business intelligence report and folders of business intelligence reports.

4. The business intelligence system of claim 1 wherein the one or more portions comprises objects in a metadata repository.

5. The business intelligence system of claim 1 wherein the one or more portions comprises a report definition element.

6. The business intelligence system of claim 1 wherein business intelligence system components comprise objects.

7. The business intelligence system of claim 1 wherein electronic learning system components are associated with business intelligence system objects.

8. The business intelligence system of claim 7 wherein the business intelligence interface system determines electronic learning system components associated with business intelligence elements based on the business intelligence object.

9. The business intelligence system of claim 1 wherein the business intelligence interface system determines whether to enable access based on a privilege associated with the user, the privilege indicating information about electronic learning for that user.

10. The business intelligence system of claim 9 wherein the privilege associated with the user indicates whether the user may access a business intelligence object based on the user's electronic learning history.

11. The business intelligence system of claim 9 wherein the privilege associated with the user indicates whether the user may access a group of business intelligence objects based on the user's electronic learning history.

12. The business intelligence system of claim 1 wherein the electronic learning comprises completion of a lesson.

13. The business intelligence system of claim 1 wherein the electronic learning comprises achieving a predetermined score on one or more tests.

14. The business intelligence system of claim 1, wherein the business intelligence system utilizes one or more on-line analytical processing systems.

15. The business intelligence system of claim 1, further comprising:
   a user interface of the business intelligence system, the user interface allowing the user to create a lesson associated with an object, wherein successful completion of the lesson grants access to the object.

16. The business intelligence system of claim 15, wherein the user interface comprises a graphical user interface providing a selection of available learning objects to associate with the object.

17. A method of enabling access to business intelligence elements comprising:

associating electronic learning elements with a business intelligence system object;

displaying available business intelligence system objects to users; and utilizing a web service to disable a business intelligence system object for a user based on information associated with the user and the business intelligence object related to the electronic learning element.

18. The method of claim 17 wherein the information comprises an indication that the user has not completed the electronic learning element associated with the disabled electronic object.

19. The method of claim 17 further comprising the act of:
providing the electronic learning element to the user; and
upon completion of the electronic learning element, enabling the business intelligence object for the user.

20. The method of claim 17 wherein the one or more portions comprise at least one of a business intelligence report and folders of business intelligence reports.

21. The method of claim 17 wherein the one or more portions comprises objects in a metadata repository.

22. The method of claim 17 wherein the one or more portions comprises a report definition element.

23. The method of claim 17 wherein the disabling act comprises the act of determining whether to enable access based on a privilege associated with the user, the privilege indicating information about electronic learning for that user.

24. The method of claim 23 wherein the privilege associated with the user indicates whether the user may access a business intelligence object based on the user's electronic learning history.

25. The method of claim 23 wherein the privilege associated with the user indicates whether the user may access a group of business intelligence objects based on the user's electronic learning history.

26. The method of claim 17 wherein the electronic learning comprises completion of a lesson.

27. The method of claim 17 wherein the electronic learning comprises achieving a predetermined score on one or more tests.

28. The method of claim 17, further comprising:
receiving feedback from the user on the effectiveness of a lesson.

29. A business intelligence system comprising:
a business intelligence object repository storing a plurality of business intelligence objects, one or more of the business intelligence objects being associated with electronic learning content;
a user database system storing information about users, the user database system storing for one or more users information about a privilege associated one or more business intelligence objects, the privilege being based on information about the user related to the electronic learning content associated with the one or more business intelligence objects; and
a business intelligence interface system that utilizes a web service to enable access to business intelligence objects based on the user privilege related to the electronic learning content associated with the business intelligence object.

30. The business intelligence system of claim 29 wherein the business intelligence objects comprises at least one of a business intelligence report and a folder of business intelligence reports.

31. The business intelligence system of claim 29 wherein the business intelligence object comprises a report definition element.

32. The business intelligence system of claim 29 wherein the privilege associated with the user indicates whether the user may access a business intelligence object based on the user's electronic learning history.

33. The business intelligence system of claim 29 wherein the privilege associated with the user indicates whether the user may access a group of business intelligence objects based on the user's electronic learning history.

34. The business intelligence system of claim 29 wherein the electronic learning comprises completion of a lesson.

35. The business intelligence system of claim 29 wherein the electronic learning comprises achieving a predetermined score on one or more tests.

* * * * *